United States Patent

Bowker et al.

[15] 3,698,818
[45] Oct. 17, 1972

[54] LOG DIAMETER SCANNER INCLUDING A PLURALITY OF PHOTODETECTORS

[72] Inventors: John F. Bowker, Linnwood; Warren H. Odegard, Seattle, both of Wash.

[73] Assignee: The Black Clawson Company, Hamilton, Ohio

[22] Filed: April 27, 1971

[21] Appl. No.: 137,846

[52] U.S. Cl. .......................... 356/160, 250/219 WD
[51] Int. Cl. .............................................. G01b 11/10
[58] Field of Search............. 356/156, 159, 160, 167; 250/219 S, 219 WD, 219 TH, 223 R, 219 LG

[56] References Cited

UNITED STATES PATENTS 3,615,139   10/1971   Bostrom ................... 356/160

Primary Examiner—Ronald L. Wibert
Assistant Examiner—Orville B. Chew, II
Attorney—Marechal, Biebel, French & Bugg

[57] ABSTRACT

A log diameter measuring device includes a plurality of spaced apart photodetectors positioned to receive light from a corresponding number of lamps. A conveyor transports logs or veneer blocks between the photodetectors and the lamps with the log axis parallel thereto. A tachometer pulse generator attached to the conveyor supplies pulses for predetermined increments of log movement, and gate circuits are employed to gate these tachometer pulses into counters during the time that the photodetectors are darkened due to the presence of the log. One counter circuit accumulates pulses representing the average number of photodetectors darkened for each tachometer pulse and thus contains a number representing the average diameter of the log. Another counter circuit is employed to count the number of tachometer pulses which occur when all of the photodetectors are darkened, thus representing the diameter of the maximum right cylinder contained within the log. An augmenting circuit may be used to provide pulses to this last counter representing the minimum diameter of the log at any of the locations sensed by the photodetectors. A paper tape perforator is employed to record permanently the information stored in the counters for each log, and this information may then be used to determine the actual volume of useable wood entering a veneer mill.

7 Claims, 9 Drawing Figures

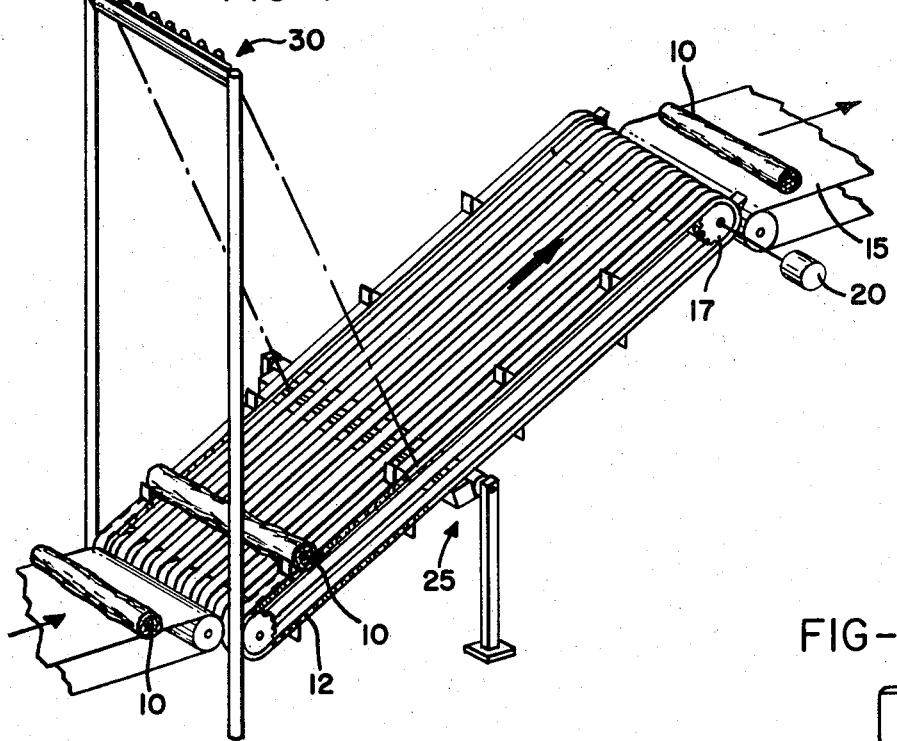
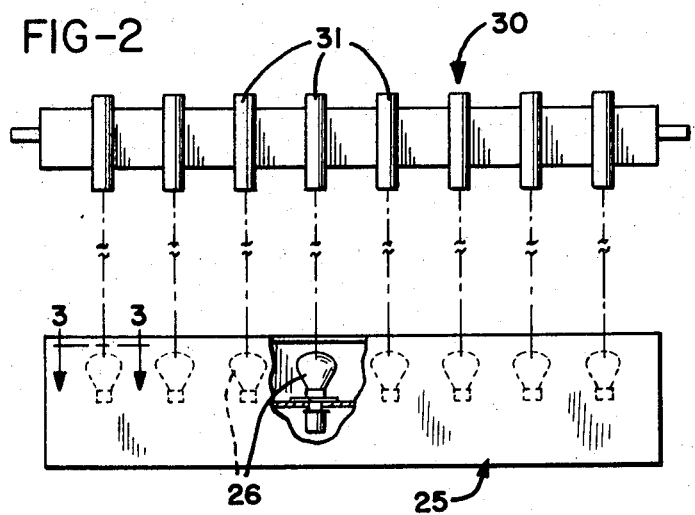
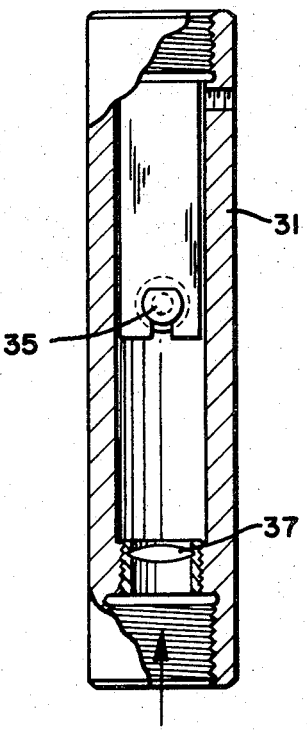
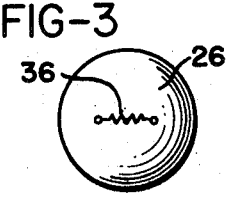
INVENTORS
JOHN F. BOWKER &
WARREN H. ODEGARD

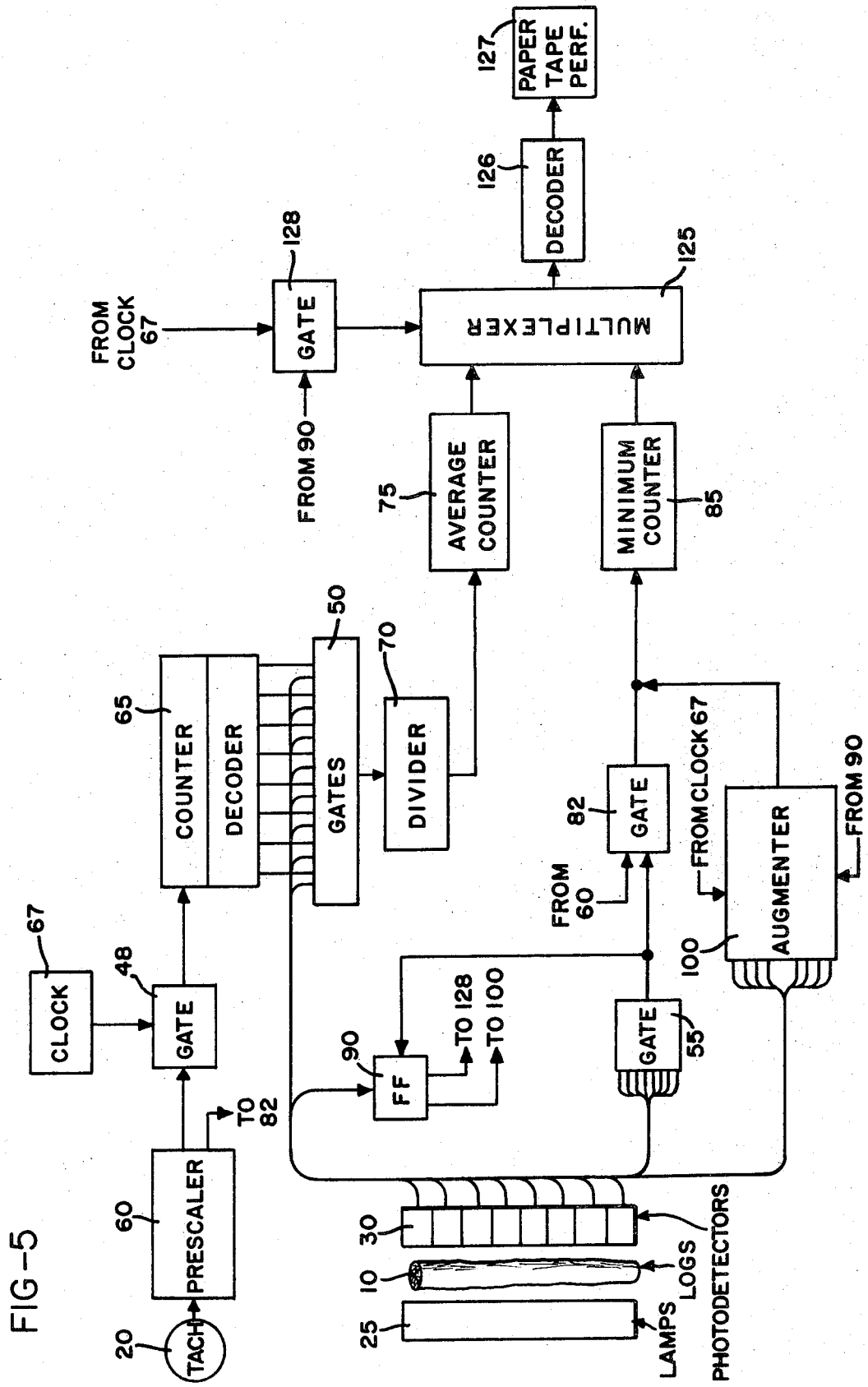

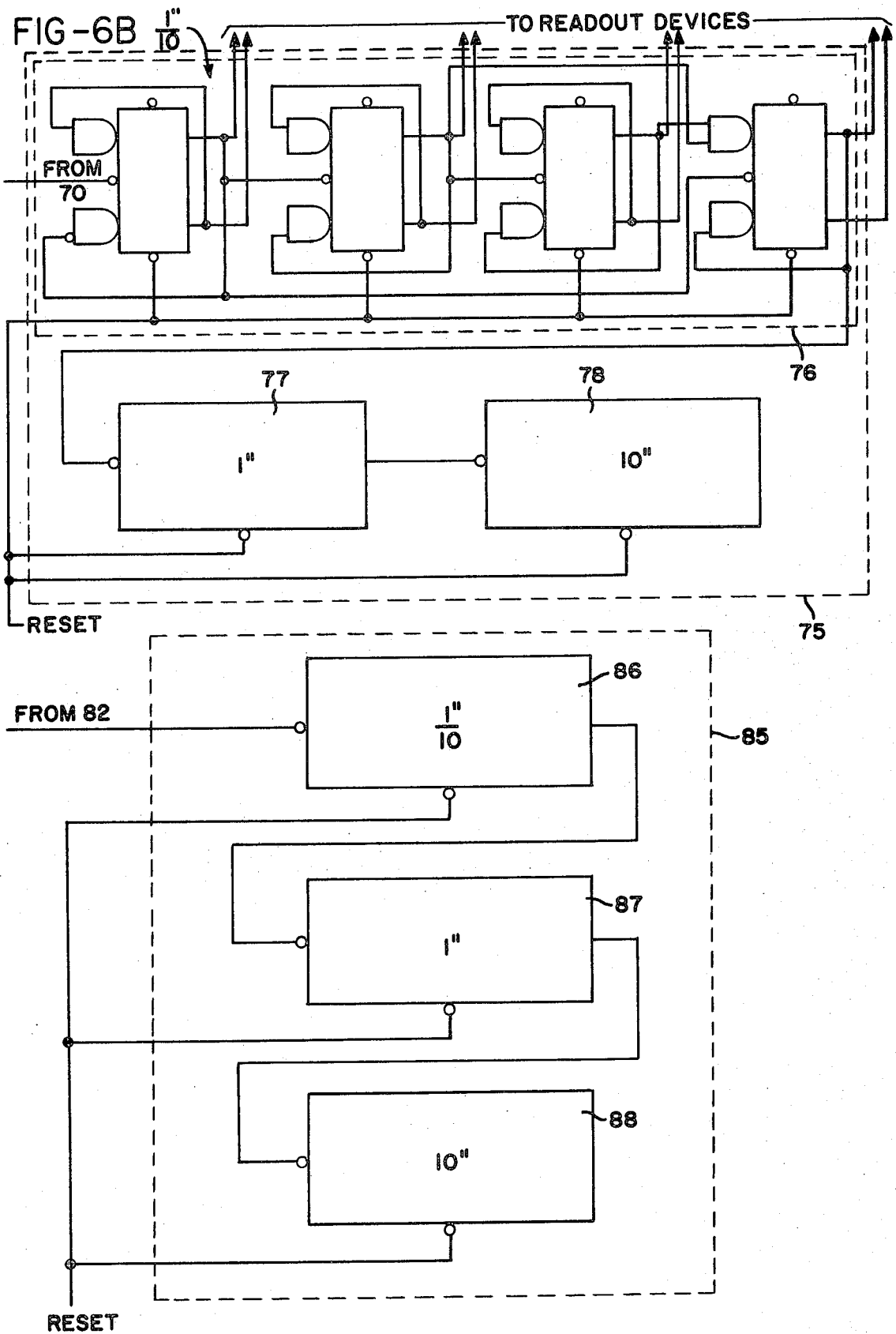

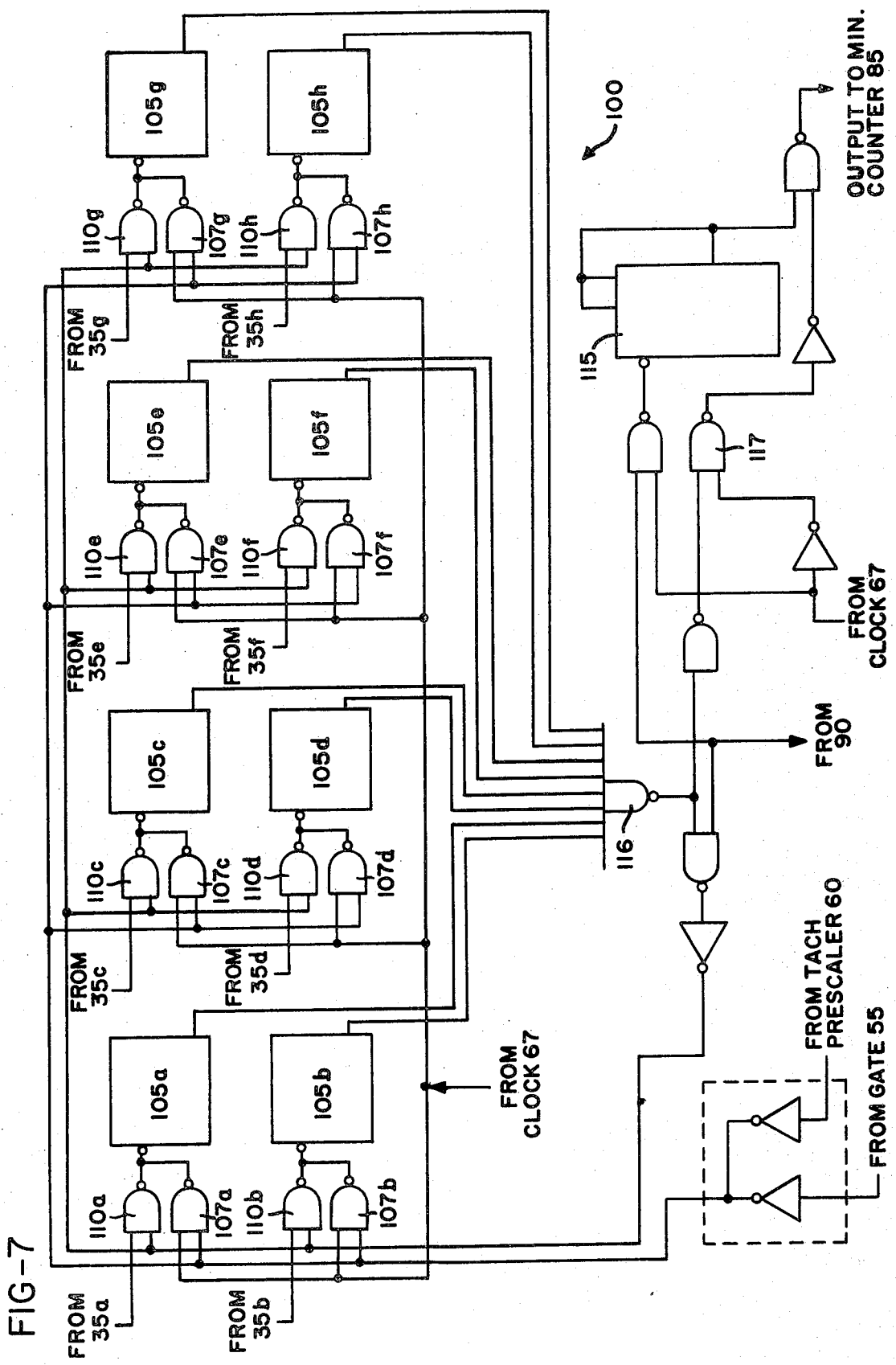

LOG DIAMETER SCANNER INCLUDING A PLURALITY OF PHOTODETECTORS

BACKGROUND OF THE INVENTION

In determining the efficiency of a veneer mill, the volume of wood entering the mill should be known. Logs are usually supplied to the mill in standard lengths, each being called a veneer block. In some mills, only one end of these veneer blocks are measured, and it has been assumed that each block has a standard degree of taper. This, of course, is not always true and therefore the volume of the wood entering the mill is not accurately known.

Since veneer is being produced from these blocks, it is desirable to know the minimum diameter, as well as the maximum right cylinder within each block in order to determine accurately the volume of useable wood and therefore the efficiency of the veneer mill. Accordingly, the diameter of the log at several locations along its length should be determined.

SUMMARY OF THE INVENTION

This invention relates to a log diameter measuring system which uses a plurality of light sources positioned on one side of a conveyor and a plurality of photodetectors positioned on the other side of the conveyor with the axis of the log passing parallel to the light source and the photodetectors.

A tachometer pulse generator is attached to the conveyor and supplies output pulses for specified increments of movement of the log. Counting circuits are employed to count the number of pulses during the time that the plurality of photodetectors are darkened, thus indicating the presence of the log.

In the preferred embodiment, one counter circuit is employed which accumulates a number of pulses representing the average number of photodetectors which are darkened so that the total count in the counter when all of the photodetectors finally become illuminated, indicating the passage of the log, represents the average diameter of the log.

Another counting circuit, a minimum counter, is employed which counts a number of tachometer pulses representing log movement only when all of the photodetectors are darkened. This provides information about the maximum diameter of a right cylinder within the log.

In one modification of the invention, an augmenting circuit is employed to provide an additional number of pulses to the minimum counter so that the minimum diameter of the log at any of the locations scanned is recorded.

The data stored in each of the counters may be read out visually by means of electronic display tubes and may also be recorded on a perforated tape after the passage of each log. This recorded information may be used as a management tool in determining the volume of useable wood entering a veneer mill, and this information may be compared with the volume of veneer coming from the mill to provide some indication of mill efficiency.

Accordingly, it is an object of this invention to provide an improved log scanning apparatus of the type described wherein the average diameter of the log is computed and wherein the diameter of the maximum right cylinder within a log is also computed; to provide an improved apparatus of the type described wherein the minimum diameter of a log is determined; and to provide an improved apparatus of the type described wherein the average and minimum diameters may be recorded permanently for use as a management tool in determining the volume of useful wood entering a veneer mill.

These and other objects and advantages of the invention will be apparent from the following description, the accompanying drawings and the appended claims.

BRIEF DESCRIPTION OF THE DRAWINGS

FIG. 1 is a perspective view showing a veneer block conveyor with a light source and photodetectors for determining the diameter of the veneer block at several locations;

FIG. 2 is an elevational view showing the relationship between the lamps and corresponding photodetectors;

FIG. 3 is a view taken along line 3—3 in FIG. 2 showing the orientation of the lamp filament;

FIG. 4 is a detailed view showing one photodetector mounted on a printed circuit board within a housing along with a lens to focus the light from its corresponding lamp onto the photodetector;

FIG. 5 is a block diagram of the electrical circuitry used to determine the average and the minimum diameter of each veneer block;

FIGS. 6a and 6b are electrical schematic diagrams showing the circuitry used to obtain the average diameter and the minimum diameter of each veneer block;

FIG. 7 is an electrical schematic diagram showing an augmeter circuit which is used in providing the minimum diameter.

DESCRIPTION OF THE PREFERRED EMBODIMENT

Figure 6A:
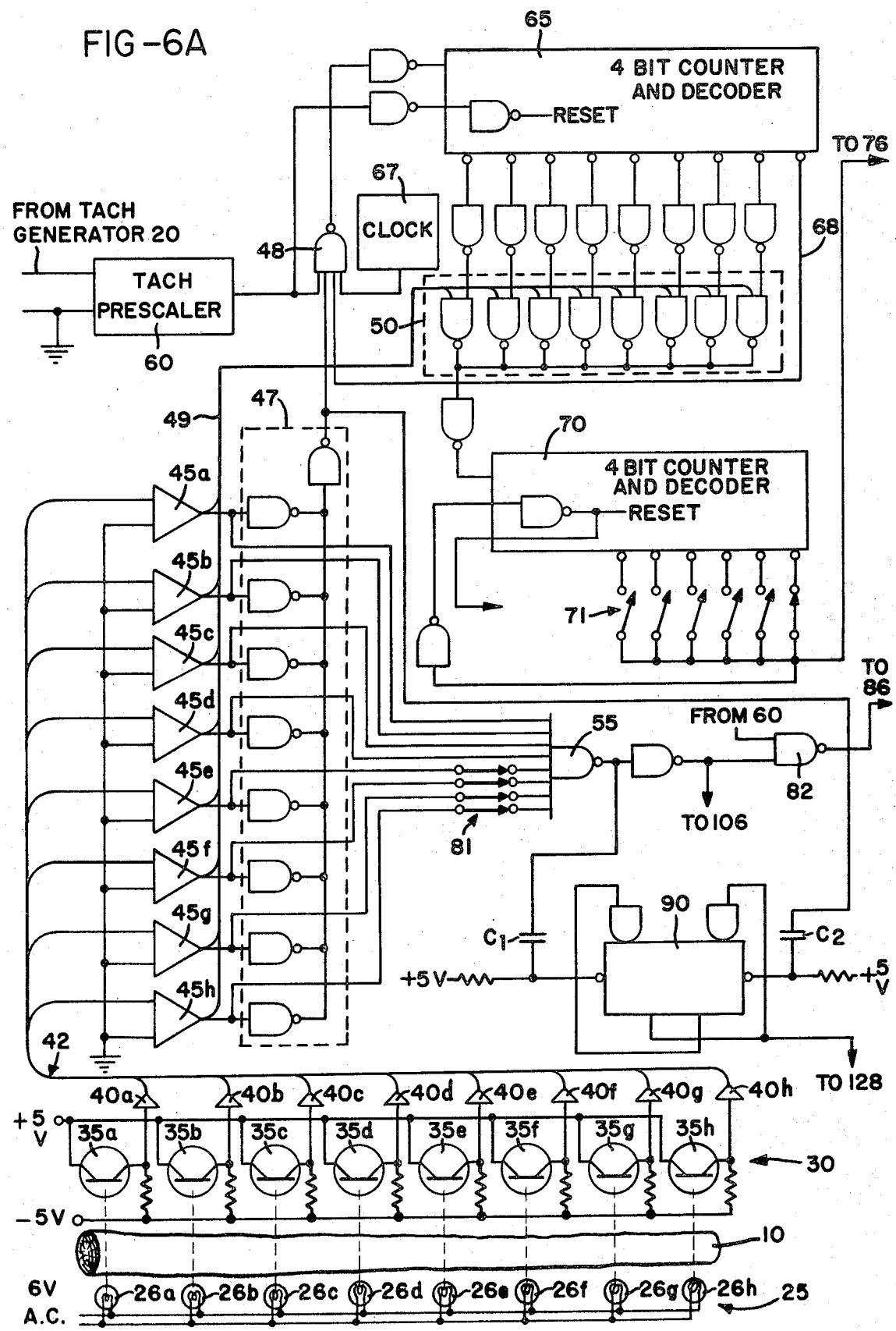

Referring now to the drawings which show the preferred embodiment of the invention, and particularly to FIG. 1, veneer blocks 10 are supplied to a conveyor 12 which moves the veneer blocks to a lathe charger 15. Each veneer block averages 18 inches in diameter, however the diameter may range from 18 inches to 53 inches. The veneer blocks are about 102 inches in length.

A conveyor head shaft 17 has connected thereto a tachometer pulse generator 20 which provides output pulses for predetermined increments of movement of the conveyor. Mounted below the conveyor is a light source 25 which includes a plurality of individual lamps 26. A photodetector array 30 is mounted on the other side of the conveyor, and includes a plurality of photodetector housings 31 each containing a a photodetector 35, preferably a phototransistor, which has the image of the filaments 36 of the lamps 26 focused thereon by means of a lens 37 (FIG. 4).

The spacing between the photodetector housings 31 preferably corresponds to the spacing between the lamps. Also, the photodetectors are preferably evenly spaced, however, this is not required and in some cases is not possible due to the construction of the conveyor. For the purpose of measuring the diameter of veneer blocks it has been found that eight photodetectors will provide adequate diameter information.

The filament 36 of each lamp 26, as shown in FIG. 3, is parallel to the axis of the veneer block. This is done to improve the accuracy of the log diameter measurement. The lamps 26 in the preferred embodiment of the invention are incandescent and have a spectral output curve which approximates the sensitivity response curve of the photodetectors.

Referring now to FIGS. 5 and 6 which disclose the electronic circuitry used in determining average and minimum veneer block diameters, eight phototransistors 35a through 35h continuously observe the light from the lamps 26a through 26h. The output of these photodetectors are applied through individual amplifiers 40a–40h and are then carried by a cable 42 to a corresponding number of line receivers 45a–45h. The cable 42 may be of considerable length, such as 150 feet, to permit the circuitry shown in FIGS. 6–8 to be located remote from the conveyor and lathe charger equipment.

There are three outputs from the line receivers 45a–45bu. The first is connected to an OR circuit 47, and the output of this OR circuit is connected to a NAND gate 48. The second output from the line receivers 45a–45h is connected by way of cable 49 to a second OR gate 50, the function of which will be described later. The third output from the line receivers is connected to a NAND gate 55.

Figure 8:
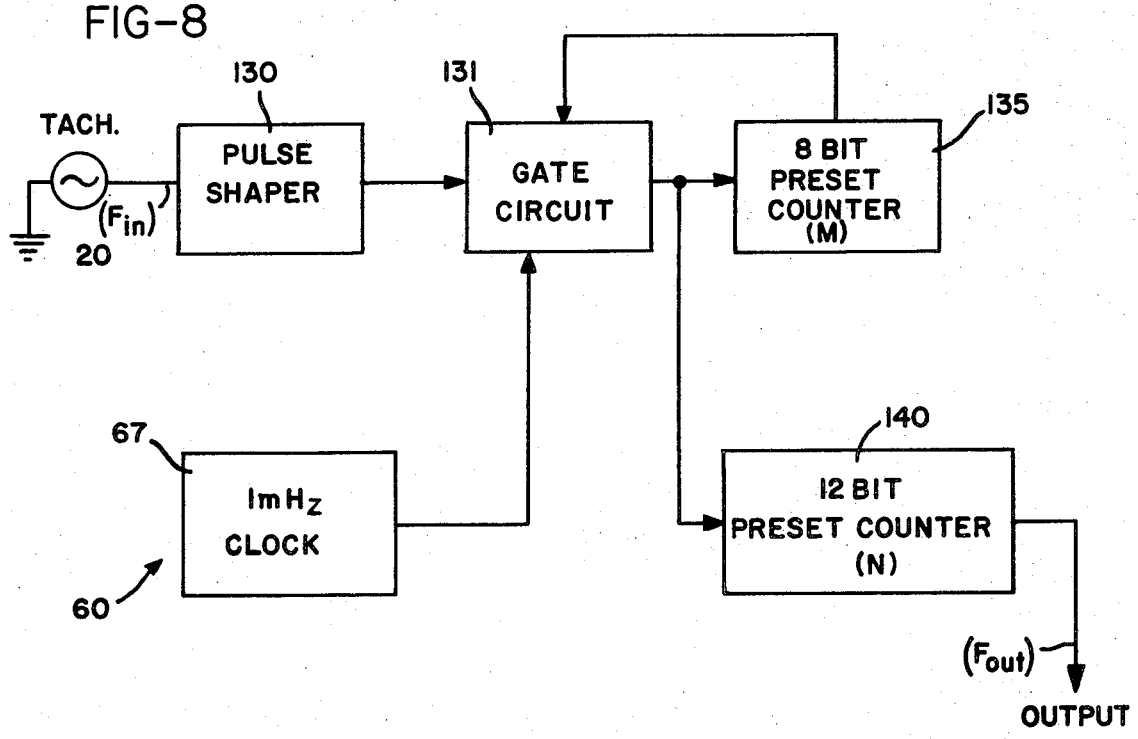
FIG. 8 is a block diagram of a tachometer prescaler circuit.

The tachometer pulse generator 20 provides an output to a tachometer prescaler circuit 60, shown in greater detail in FIG. 8, which converts the tachometer pulse output into a series of pulses which represent one tenth inch increments of log travel. Briefly described, the tachometer prescaler is a divider circuit which may be adjusted so that its output always represents predetermined lengths of travel, preferably related to conventional units of length, in this case one tenth inch. The tachometer prescaler output may be represented by the following expression: $F_{out} = (M/N)F_{in}$, where $F_{out}$ and $F_{in}$ is the frequency of the output and input pulses, respectively, and where $M$ and $N$ are integers and are selected when calibrating the tachometer against the movement of the conveyor.

One output of the tachometer prescaler 60 is connected to NAND gate 48. Anouther output from the tachometer output prescaler is connected to a four bit counter and decoder circuit 65 and functions to reset the counter. A clock 67 supplies output pulses at approximately 1 mHz to NAND gate 48.

Gate 48 is enabled and will supply clock pulses to the counter and decoder circuit 65 when any one of the photodetectors 35a–35h senses the presence of a veneer block, as evidenced by an output from the OR gate 47, and will do this upon the occurrence of each tachometer pulse. Sufficient clock pulses are provided during each tachometer pulse to fill completely the counter 65. When the counter 65 is filled, an output on line 68 inhibits NAND gate 48 to stop the entry of further clock pulses.

The output of the counter and decoder circuit 65 is connected to OR gate 50, along with the outputs from the individual photodetectors 35a–35h, and the output of this OR gate is connected to a divider 70. The output from OR gate 50 is a series of pulses representing each photodetector which senses the presence of a veneer block during each output pulse from the tachometer prescaler 60. The output of the divider 70 is this series of pulses divided by the number of photodetectors used. One of the switches 71 is closed according to the number of photodetectors in operation. In the preferred embodiment, the divider 70 is a four bit counter and decoder circumit similar to the counter and decoder circuit 65.

The output of the divider circuit 70 is applied to an average counter circuit 75 which, in the preferred embodiment, includes three BCD (binary coded decimal) counters 76, 77 and 78. Counter 76 counts one tenth inch increments of travel while counters 77 and 78 count units and tens, respectively.

Thus, the count stored in the average counter 75 is an accumulation of the average number of photodetectors which are darkened by the presence of a veneer block for each tachometer pulse which occurs while the veneer block is passing between the light source and the photodetectors.

Referring again to FIGS. 5 and 6, the minimum diameter of the veneer block being scanned is determined in the following manner. The outputs from the line receivers 45a–45h are connected to NAND gate 55. Switches 81 are provided to disconnect one or more of the photodetectors when measuring logs of less than standard length for veneer blocks. The NAND gate 55 has its output connected to NAND gate 82 which combines this output with the pulse output from the tachometer prescaler 60, and the output from NAND gate 82 is applied to a minimum counter 85. This counter is similar to the average counter 75 in that it contains three BCD counters 86, 87 and 88 which store one tenth inch, 1 inch and 10 inch diameter measurements, respectively.

As described thus far, the counter 85 will record the number of output pulses from the tachometer prescaler during that time when all of the selected photodetectors are sensing the presence of a veneer block. Therefore, if this counter were not further modified, the count stored therein at the completion of the scanning sequence would represent the maximum diameter of a right cylinder contained within the veneer block.

The circuit shown in FIG. 6 also includes a latching circuit 90 which is used to initiate the operation of a tape perforator. This latching circuit is initially reset by an output from NAND gate 55 through capacitor C1 which represents the presence of a log, and is set to initiate the perforator operation when the log passes the scanner as represented by an output from the photodetectors that all are receiving light. This signal is provided from NOR gate 47 through capacitor C2.

The photodetector outputs are also connected to an augmeter circuit shown generally at 100 in FIG. 5. This circuit is used in those applications where it is desired to know the minimum diameter of the veneer block rather than the diameter of the maximum right cylinder which is contained within the block. The minimum diameter is obviously equal to or greater than the diameter of the maximum right cylinder . Since the diameter of the maximum right cylinder is already recorded in the counter 85, all that is necessary to modify this information so that the counter represents a minimum diameter is to add, if necessary, a number of tachometer pulses to this counter. This is done by the circuit shown in FIG. 7.

The augmeter circuit 100 contains counters 105a–105h for each photodetector. In the preferred embodiment, these counters are eight bit binary counters. Initially, all of the counters are reset to zero. Any time during that portion of the scan when the photodetectors are not all dark (that is, before or after the maximum diameter of a right cylinder is present), output pulses from the tachometer prescaler 60 are applied through gate 106 to the input gates 107a–107h of each counter. Also applied to these input gates is the output from each corresponding photodetector, and therefore each counter which is connected to a photodetector sensing the presence of the veneer block will accumulate pulses. When all photodetectors become dark, the tachometer pulses from the prescaler 60 will be inhibited by gate circuit 106. Therefore, the counters 105a–105h may accumulate a number of pulses only in excess of the maximum diameter of the right cylinder contained within the veneer block.

At the completion of the scanning operation, as evidenced by an output from the latching circuit 90, the counters 105a–105h are interrogated, and the counter containing the fewest number of pulses is then identified and these pulses are added to the counter 85 immediately prior to recording the information from this counter.

Upon a signal from the latching circuit 90, gates 110a through 110h are enabled and allow clock pulses from the clock 67 to advance each of the counters 105a–105h and at the same time advance counter 115. NAND gate 116 is connected to the output of each of counters 105a –105h and provides an output when the last of these counters is filled. An output from this NAND gate prevents further clock pulses from entering any of the counters 105. The output of NAND gate 116 also enables gate 117 and allows the clock pulses to be applied to the counter 85 until counter 115 fills completely. In a majority of cases, only a few clock pulses will be added to the counter 85.

It may be noted that these clock pulses are added during the time that the perforator is preparing to record the contents of counters 75 and 85, but since the clock pulse rate is in the order or 1 mHz, the modification of counter 85 is accomplished long before the perforator began recording.

Referring again to FIG. 5, the outputs from counters 75 and 85 are applied to a multiplex circuit 125, and the output of this multiplex circuit is applied through a decoder 126 to a paper tape perforator 127. The multiplexer 125 is enabled by a signal from the latching circuit 90 to gate 128 to scan the contents of the counter 75 and 85, and this multiplexer 125, along with the decoder circuit 126, converts the contents of these counters into either a Hollerith or ASCII code. In some embodiments of the invention, it may also be desirable to provide electronic readout tubes so that the operator may quickly and visually determine the average and minimum diameter of each veneer block.

The tachometer prescaler circuit 60 is shown in block diagram form in FIG. 8. Output pulses from the tachometer 20 are applied to a pulse shaping circuit 130 which changes the sinusoidal output of the tachometer into a square wave. The output of the pulse shaper is connected to a gate 131 which also receives clock pulses from the 1 mHz clock 67.

The output of the gate 131 is applied to an eight bit preset counter 135. This counter represents the integer M and is preset with a specified number. When this counter fills, it will provide an output on line 136 to shut off the gate 131.

During the time during which gate 131 is open, clock pulses from the clock 67 are also applied to a 12 bit preset counter 140. This counter contains a number representing the integer N and is preset to a different specified number.

Therefore, for each tachometer pulse, a number of clock pulses, as determined by counter 135, are entered into counter 140. Each time counter 140 fills to its preset number, it resets itself and supplies an output pulse to the circuit shown in FIGS. 5 and 6.

The information thus gained regarding the average diameter, the maximum right cylinder diameter or the minimum diameter may be used as a management tool in determining the efficiency of the subsequent operation performed on the veneer block since it is now possible to determine accurately the volume of wood entering the mill. It is also possible to use this information to determine the quality of the wood coming into the mill, and this information may be used as a basis for pricing.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for scanning logs including
an elongated source of light;
a plurality of photodetectors arranged in a row parallel to the direction of elongation of said source of light;
means for moving a log with its axis parallel to and between said source of light and said photodetectors;
means for supplying pulses representing increments of movement of the log;
clock means for providing a second source of pulses;
a first counter;
gate means connected to said clock means and to the output of said pulse supplying means for applying clock pulses to said first counter for each increment of travel of the log;
second gate means connected to the output of said first counter and to individual ones of said photodetectors for providing an output for each photodetector which is darkened due to the presence of the log between said photodetector and said light source;
a divider for dividing the number of pulses from said second gate means by the number of photodetectors in operation; and
a second counter for counting the total pulse output from said divider for each log to provide an indication of the average diameter of the log.

2. The apparatus of claim 1 further including third gate means connected to the output of all of said photodetectors and to said pulse supplying means to provide a number of pulses during that period when all of said photodetectors are darkened due to the presence of the log; and third counter means connected to the output of said third gate means for recounting said pulses to provide an indication of the diameter of the maximum right cylinder available in the log.

3. The apparatus of claim 2 further including counting means connected to the output of said photodetectors and to said third counter to provide additional pulses to said third counter to provide an indication of the minimum diameter of said log at any one of the photodetector locations.

4. The apparatus of claim 1 wherein said means for supplying pulses representing increments of movement of the log includes means for converting these pulses into other pulses having a predetermined spacing specifically related to conventional units of length measurement.

5. The apparatus of claim 4 wherein said pulse converting means includes clock means for supplying clock pulses at a rate higher than the pulse rate of said pulse supplying means;

first and second adjustable counter means;

gate means enabled by pulses from said pulse supply means for connection said clock to said first and second counter means;

said gate means being disabled when said first counter obtains a predetermined count and said first counter being reset to receive clock pulses on the occurrence of subsequent pulses from said pulse supply means;

said second counter means providing an output pulse each time it obtains a predetermined count; and whereby the rate of the pulse output from said second counter means is determined by the rate of pulses from said pulse supply means as modified by the ratio of the predetermined counts set into said first and second counter means.

6. Apparatus for scanning logs including:

an elongated source of light;

a plurality of photodetectors arranged in a row parallel to the direction of elongation of said source of light;

means for moving a log with its axis parallel to and between said source of light and said photo detectors;

means for supplying pulses representing increments of movement of the log;

gate means connected to the output of all of said photo detectors and to said pulse supplying means for providing pulses during that period when all of said photo detectors are darkened due to the presence of a log;

counter means connected to the output of said gate means for counting said pulses to provide an indication of the diameter of the maximum right cylinder in the log;

and means connected to the output of individual ones of said photo detectors and to said counter means for providing additional pulses to said counter means to provide an indication of the minimum diameter of the log at any one of the photo detector locations.

7. The apparatus of claim 6 wherein said means for providing additional pulses includes:

a plurality of individual counters each connected to a corresponding photo detector;

means for supplying clocking pulses to said individual counters when said corresponding photo detectors are darkened;

means for inhibiting said clocking pulses to all of said individual counters when all of said photo detectors are darkened;

and means for determining the individual counter storing the fewest number of pulses and for supplying those pulses to said counter means.

* * * * *